(12) United States Patent
Suzawa et al.

(10) Patent No.: US 6,858,563 B2
(45) Date of Patent: Feb. 22, 2005

(54) CATALYST FOR AUTOMOBILES

(75) Inventors: Takumi Suzawa, Okazaki (JP);
Masakazu Tanaka, Okazaki (JP);
Kazuhiko Koike, Okazaki (JP); Miho Ito, Hoi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/281,265

(22) Filed: Oct. 28, 2002

(65) Prior Publication Data

US 2003/0083192 A1 May 1, 2003

(30) Foreign Application Priority Data

Oct. 26, 2001 (JP) ......................................... 2001-328768
Jun. 27, 2002 (JP) ......................................... 2002-187178

(51) Int. Cl.[7] .................................................. B01J 21/04
(52) U.S. Cl. ....................................... 502/439; 502/327
(58) Field of Search ................................. 502/325, 326, 502/327, 332, 333, 334, 339, 355, 415, 439

(56) References Cited

U.S. PATENT DOCUMENTS

| | | | |
|---|---|---|---|
| 3,956,186 A | | 5/1976 | Iwase et al. |
| 4,189,405 A | | 2/1980 | Knapton et al. |
| 4,956,329 A | | 9/1990 | Chao et al. |
| 5,346,722 A | | 9/1994 | Beauseigneur et al. |
| 5,384,300 A | * | 1/1995 | Feeley et al. ............. 502/252 |
| 5,489,865 A | | 2/1996 | Colvin, Sr. |
| 5,490,977 A | * | 2/1996 | Wan et al. ................. 423/210 |
| 5,551,239 A | * | 9/1996 | Feeley et al. .............. 60/723 |
| 5,556,604 A | | 9/1996 | Zahn et al. |
| 5,607,885 A | | 3/1997 | Ichii et al. |
| 5,716,899 A | | 2/1998 | Guile et al. |
| 5,902,557 A | * | 5/1999 | Yotsuya et al. ............ 422/174 |
| 5,941,068 A | * | 8/1999 | Brown et al. ............... 60/297 |
| 6,171,573 B1 | | 1/2001 | Sato |
| 6,294,140 B1 | * | 9/2001 | Mussmann et al. ........ 423/213.5 |
| 6,497,851 B1 | * | 12/2002 | Hu et al. ................... 423/213.5 |
| 6,524,992 B2 | * | 2/2003 | Mussmann et al. ........ 502/304 |
| 2001/0011455 A1 | | 8/2001 | Harima et al. |

FOREIGN PATENT DOCUMENTS

| | | |
|---|---|---|
| EP | 1 043 067 A2 | 10/2000 |
| EP | 1043067 A2 | 10/2000 |
| JP | 62004441 | 1/1987 |
| JP | B-5-50338 | 7/1993 |
| JP | 2001310128 | 11/2001 |
| JP | A-2001-310128 | 11/2001 |

* cited by examiner

*Primary Examiner*—Stanley S. Silverman
*Assistant Examiner*—Edward M. Johnson
(74) *Attorney, Agent, or Firm*—Nixon & Vanderhye P.C.

(57) ABSTRACT

This invention aims at achieving early activation by use of a catalytic body having a low thermal capacity, and a low pressure loss, without using a coating layer to reduce exhaust emission. The invention is directed also to improve exhaust purification performance by improving the combination of catalytic bodies and performance of each catalytic body. In the invention, a start catalyst 1 is arranged at an upstream portion of an exhaust pipe P of a car engine E and a three way catalyst 2 is disposed on the downstream side. The start catalyst 1 can directly support catalytic components through chemical bonds by incorporating replacing elements into a substrate ceramic having high heat resistance such as cordierite. Because a coating layer is not necessary, the catalyst of the invention has a low heat capacity and a large open area and achieves reduction of exhaust emission, and reduction of a pressure loss, through early activation.

19 Claims, 7 Drawing Sheets

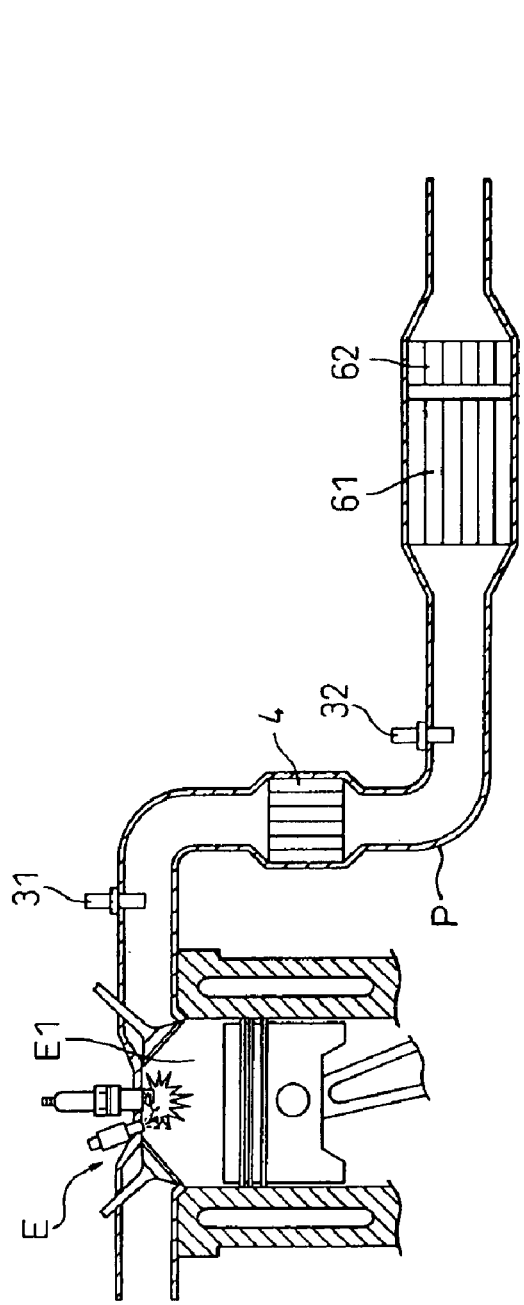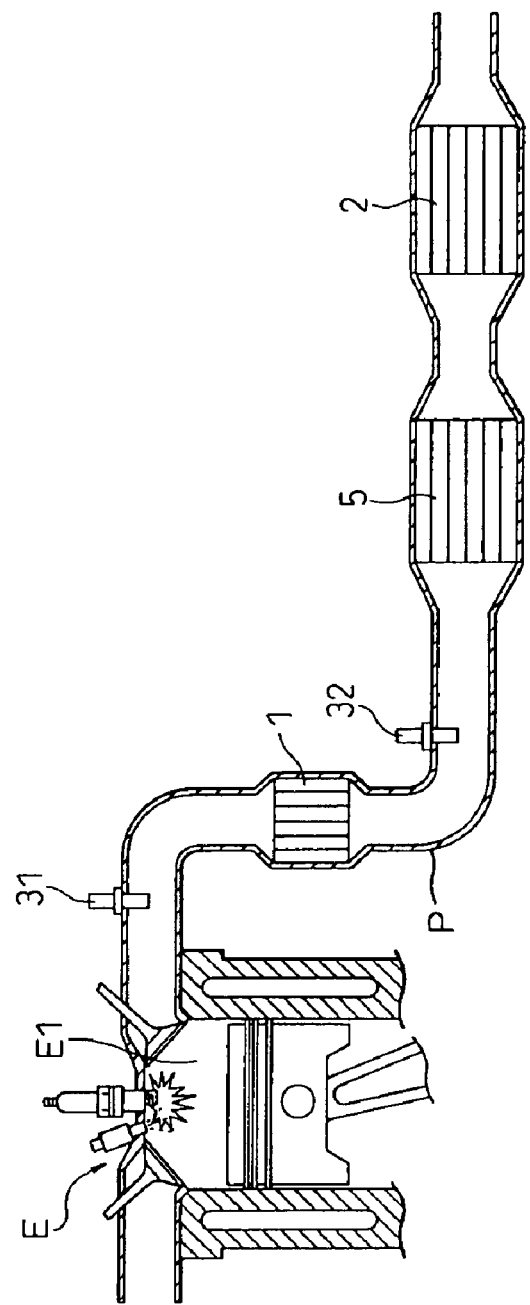

CATALYST FOR AUTOMOBILES

BACKGROUND OF THE INVENTION

1. Field of the Invention

This invention relates to a catalyst for automobiles that is used for purifying an exhaust gas emitted from an internal combustion engine of an automobile.

2. Description of the Related Art

To protect the environment, the requirements for purification of exhaust gases have been increasing in recent years. To cope with the problem, a combustion control for an internal combustion engine to control emission of pollutants and a catalytic process has been developed. A three way catalyst has gained a wide application in the past as a catalyst for such a catalyst system. The three way catalyst efficiently purifies HC, CO and NOx in the operating window of a stoichiometric air to fuel ratio. As the air to fuel ratio must be controlled within a relatively narrow range in the three way catalyst, systems that use a NOx catalyst having improved NOx reduction performance, or combine a plurality of catalysts, have been tested in a lean-burn engine and a direct injection type gasoline engine.

As shown in FIG. 8 of the accompanying drawings, these catalytic bodies generally use a monolithic catalyst support 101 formed of a highly heat-resisting ceramic such as cordierite, and include a coating layer 103 of a material having a large specific area such as γ-alumina, on its cell walls 102, to support catalytic components thereon. The main catalytic component is generally a catalyst precious metal 104 such as Pt or Rh, and an assistant catalyst 105 is further supported depending on the application. In the case of the NOx catalyst, for example, the catalyst further includes a NOx absorption material as the assistant catalyst 105 so that NOx absorbed in a lean atmosphere is emitted in a rich atmosphere, and is reduced and purified by HC and CO on the catalyst precious metal.

To reduce exhaust emission, it is desired to activate the catalyst system quickly and to prevent emission of the contaminants at the start of the engine. To achieve quick activation, it is effective to reduce the thermal capacity of the catalyst. For example, a proposal has been made that decreases the wall thickness of the catalyst support to reduce the thermal capacity of the catalyst and arranges this catalyst as a start catalyst at an upstream portion of the catalyst system to thus shorten the time required for the temperature rise of the catalyst.

In the catalysts according to the prior art, however, the coating layer 103 must be formed to support the catalytic component. Therefore, reduction of the thermal capacity is limited when merely decreasing the thickness of the cell walls 102 of the catalyst support 101. As the coating layer 103 is formed, the open area of the cells decreases with the result that a pressure loss increases.

On the other hand, a catalytic body capable of supporting a catalyst without forming a coating layer 103 has been examined. For example, a catalytic body that increases a specific surface area of a ceramic support by the application of acid treatment is known. Since this ceramic body still involves the problem of the strength, European Patent Application EP1043067A2 proposes a ceramic catalytic body that creates crystal defects or fine pores consisting of fine cracks on a ceramic surface to impart a catalyst supporting capability to a ceramic support, and supports catalytic components on the ceramic support.

SUMMARY OF THE INVENTION

It is therefore an object of the invention to provide a catalyst for automobiles that achieves quick activation by using a catalytic body having a low heat capacity and a low pressure loss without using a coating layer, reduces exhaust emission, and improves the exhaust purification performance by combining in various ways the catalytic bodies and by improving the performance of each catalytic body.

According to a first aspect of the invention, there is provided a catalyst for automobiles including a plurality of catalytic bodies disposed at intermediate positions of an exhaust passage of an internal combustion engine of an automobiles, wherein the catalytic body disposed at the closest position to the internal combustion engine among a plurality of catalytic bodies is a direct support catalyst comprising a ceramic support capable of directly supporting a catalyst on a surface of a substrate ceramic, and catalytic components directly supported by the ceramic support.

The direct support catalyst having the catalytic components directly supported on the ceramic support does not need the coating layer. Therefore, this catalyst has a low heat capacity and a low pressure loss. When the catalyst is arranged at a position that is the closest to the internal combustion and attains the highest temperature, and is used as a start catalyst, for example, the time required for activation of the catalyst can be drastically shortened in comparison with the prior art. In consequence, exhaust emission at the start can be reduced and exhaust purification performance of the catalyst system can be drastically improved.

According to a second aspect of the invention, there is provided a catalyst for automobiles including a multi-stage integration type catalyst formed by integrating a plurality of catalyst layers at an intermediate position of an exhaust passage of an internal combustion engine of an automobile, wherein the foremost stage catalyst layer disposed at the position closest to the internal combustion engine, among a plurality of catalyst layers, is a direct support catalyst comprising a ceramic support capable of directly supporting a catalyst on a surface of a substrate ceramic.

In the catalyst system having the multi-stage integration type catalyst at an intermediate position of the exhaust passage, the foremost stage catalyst layer arranged at the nearest position to the internal combustion engine, and attaining the highest temperature, is used as the direct support catalyst in the same way as in the construction of the first aspect having a plurality of catalytic bodies, and the effect of early activation can be obtained. Therefore, it is possible to reduce exhaust emission at starting and to improve the purification performance of the catalyst system.

According to a third aspect of the invention, there is provided a catalyst for automobiles including a start catalyst disposed at an upstream portion of an exhaust passage of an internal combustion engine of an automobile and a main catalyst disposed on its downstream side, wherein the start catalyst is a direct support catalyst comprising a ceramic support capable of directly supporting a catalyst on a surface of a substrate ceramic, and catalytic components directly supported by the ceramic support. As the start catalyst comprising the direct support catalyst is arranged at an upstream portion of the exhaust passage attaining a high temperature, it is possible to effectively raise the temperature of the start catalyst and to obtain the early activation effect described above. Specifically, a three way catalyst or a NOx catalyst can be used as the main catalyst.

Similarly, the catalyst layer positioned on the downstream side of the foremost catalyst layer can use a three way catalyst or a NOx catalyst.

When the main catalyst or the catalyst layer positioned on the downstream side of the foremost stage catalyst layer contains the NOx catalyst, a supported amount of an assistant catalytic component of the catalytic components is not greater than 10 g/L in the start catalyst or in the foremost stage catalyst layer. In this way, it is possible to minimize the influence on a NOx absorption-reduction system using the NOx catalyst and to prevent the occurrence of control delay during NOx purge control. Further, a three way catalyst may be arranged on the NOx catalyst described above. When a plurality of different catalysts is combined, it becomes possible to promote purification of HC and NOx emitted during NOx purge and to more effectively reduce exhaust emission.

The catalyst layer positioned on the downstream side of the main catalyst or the foremost stage catalyst layer may take a construction in which it does not contain a NOx catalyst. In this case, when the catalytic components contain an assistant catalytic component in the start catalyst or in the foremost stage catalyst layer, the effects such as suppression of degradation and oxygen absorption can be imparted to the catalyst.

In the invention, the catalytic components contain a precious metal as a main catalytic component. The assistant catalytic component is appropriately at least one kind of a metal element, or its oxide, selected from the group consisting of Rb, Sr, Y, Zr, Nb, Mo, Tc, Ru, Sc, La, Ce, Pr, Nd, Pm, Sm, Eu, Gd, Tb, Dy, Ho, Er, Tm, Yb and Lu. These members impart the functions of oxygen absorption capability, gas adsorption capability at a low temperature, suppression of degradation of the precious metal and detection of catalyst degradation.

In the invention, at least one kind of element constituting a substrate ceramic of the ceramic support is replaced by an element other than the constituent elements, and the catalytic components can be directly supported on the replacing element. When the catalytic components are supported on such a ceramic support, the direct support catalyst described above can be obtained. In this case, the catalytic components are supported on the replacing element through chemical bonds. As the catalytic components are chemically bonded, retainability can be improved. As the catalytic components are uniformly dispersed and do not easily aggregate, the catalyst exhibits less degradation in the course of use. The replacing element is at least one kind of elements having a d or f orbit in an electron orbit thereof. An element having the d or f orbit in its electron orbit is preferable because it can be bonded more easily to the catalytic components.

In the invention, the ceramic support has a large number of fine pores capable of directly supporting the catalyst on the surface of the substrate ceramic, and the catalytic components can be directly supported in the fine pores. The fine pores comprise at least one kind of defect inside a ceramic crystal lattice, fine cracks on the ceramic surface or defects of elements constituting the ceramic. When fine cracks have a width of not greater than 100 nm, the support strength can be advantageously secured.

To support the catalytic components, the fine pores have a diameter or width of not greater than 1,000 times the diameter of catalyst ions to be supported. When the number of the fine pores is at least $1\times10^{16}$ pores/L at this time, the catalytic components can be supported in the same amount as in the prior art.

In the invention, when the substrate ceramic contains cordierite as a component thereof, the effect of thermal shock resistance is high. When the catalyst has a monolithic support shape, the effect of reducing the pressure loss by the direct support catalyst is high.

BRIEF DESCRIPTION OF THE DRAWINGS

FIGS. 1(a) and 1(b) show a first embodiment of the invention, wherein FIG. 1(a) is an overall schematic structural view of a catalyst for automobiles and FIG. 1(b) is an enlarged sectional view of principal portions of a ceramic support;

FIGS. 3(a) and 3(b) show a third embodiment of the invention, wherein FIG. 3(a) is an overall schematic structural view of a catalyst for automobiles and FIG. 3(b) is an enlarged sectional view of principal portions of a ceramic support;

FIG. 5(a) is an overall schematic structural view of a catalyst for automobiles according to a fourth embodiment of the invention;

FIG. 5(b) is an overall schematic structural view of a catalyst for automobiles according to a fifth embodiment of the invention;

DESCRIPTION OF THE PREFERRED EMBODIMENTS

Preferred embodiments of the invention will be explained hereinafter with reference to the accompanying drawings.

Figure 1A:
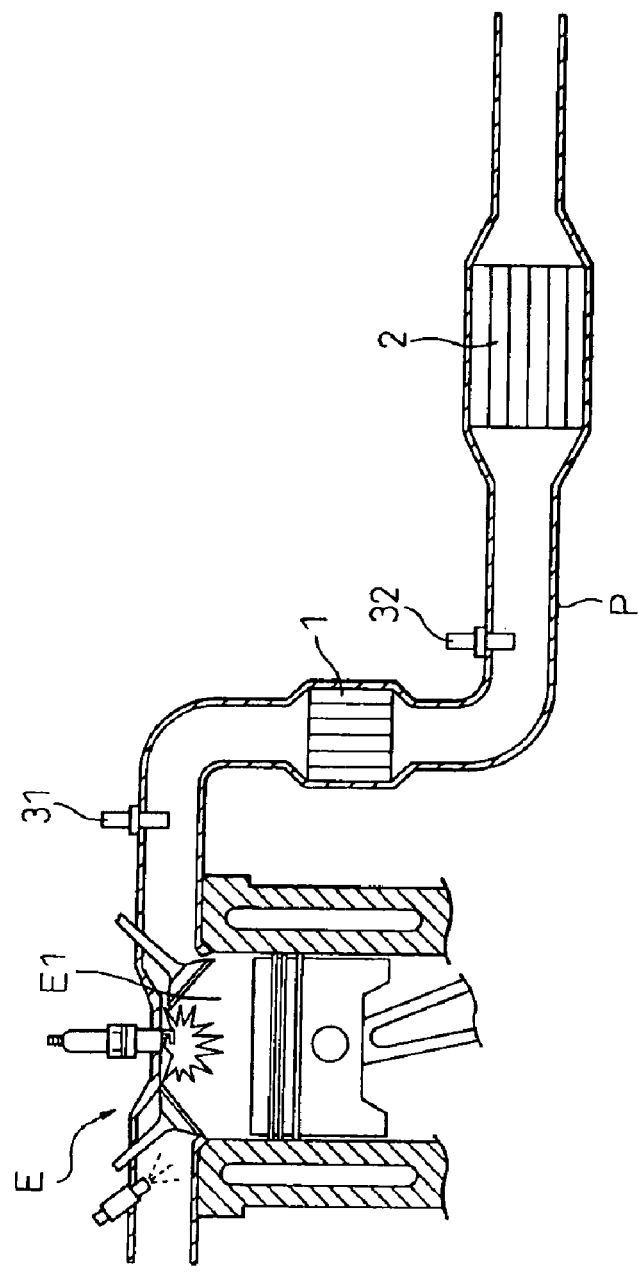
Figure 1B:
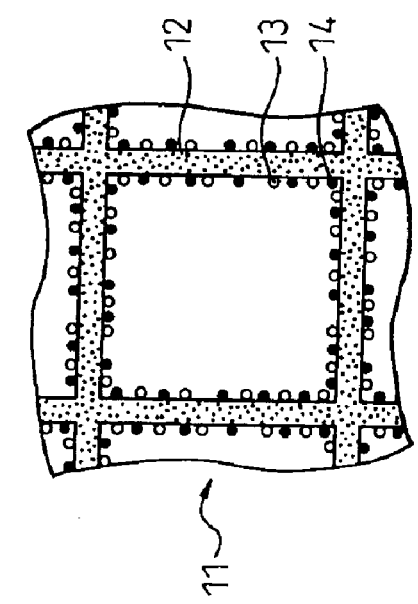

FIG. 1(a) is a schematic view showing an overall construction of a catalyst for automobiles according to an embodiment of the invention. An exhaust pipe P as an exhaust passage is connected to a combustion chamber E1 of a car engine E. A start catalyst 1 and a three way catalyst 2 are arranged at intermediate positions of the exhaust passage from an upstream side. The start catalyst 1 is arranged at a high temperature portion immediately below an exhaust manifold, for example. For early activation, the start catalyst 1 is smaller in size than the three way catalyst 2 as a main catalyst. The three way catalyst 2 is a so-called "under-the-floor catalyst" and is arranged at an intermediate position of the exhaust pipe P disposed below a cabin. Oxygen sensors 31 and 32 are positioned upstream of the start catalyst 1 and the three way catalyst 2. An exhaust gas is controlled to a desired air-fuel ratio when feedback control is conducted on the basis of the detection result of these oxygen sensors 31 and 32.

The start catalyst 1 is a direct support type catalyst that includes a ceramic support 11 capable of directly supporting a catalyst on a surface of a substrate ceramic, and a catalytic component directly supported on a surface of cell walls 12 of the ceramic support 11. A catalyst precious metal such as Pt, Rh or Pd and an assistant catalyst 14 are supported as the catalytic components. Examples of the assistant catalyst 14 include metal elements or oxides of the metal elements such as Rb, Sr, Y, Zr, Nb, Mo, Tc, Ru, Sc, etc, and lanthanoids (La, Ce, Pr, Nd, Pm, Sm, Eu, Gd, Tb, Dy, Ho, Er, Tm, Yb, Lu). One or more kinds of these elements are selected and used depending on the objects such as suppression of degradation, oxygen absorption capability and detection of catalyst degradation. When a catalytic component having high heat resistance is used for the catalytic component, the start catalyst 1 can be arranged at a higher temperature portion of the exhaust pipe P (portion closer to the engine E). Such a catalytic component is preferable from the aspect of earlier activation.

A substrate of the ceramic support 11 uses a material principally consisting of cordierite having a theoretical composition of $2MgO \cdot 2Al_2O_3 \cdot 5SiO_2$. The substrate ceramic is shaped into a monolithic shape having a large number of flow paths in a gas flowing direction and is then fired to provide the ceramic support 11. Having high heat resistance, cordierite is suitable for the start catalyst 1 arranged at an upstream portion of the exhaust pipe P having a high temperature. However, the substrate ceramic is not particularly limited to cordierite. For example, it is also possible to use alumina, spinel, aluminum titanate, silicon carbide, mullite, silica-alumina, zeolite, zirconia, silicon nitride and zirconium phosphate. The shape of the support is not limited to the monolithic shape but may take other shapes such as pellet, powder, foam body, hollow fibrous body, fiber shape, and so forth.

The ceramic support 11 has a large number of elements capable of directly supporting the catalytic components on the surface of the substrate ceramic, and these elements can directly support the catalyst metals. More concretely, the ceramic support may have a construction in which a large number of those elements that have a catalyst supporting capability through element substitution are arranged on the ceramic surface. When the ceramic support 11 has such replacing elements, it can sufficiently support the catalytic components without forming a coating layer having a high large surface area such as γ-alumina. The elements that replace the constituent elements of the ceramic, that is, the elements replacing Si, Al and Mg as the constituent elements of cordierite other than oxygen, for example, have greater bonding strength with the catalytic components to be supported than these constituent elements. Preferred are those elements that can support the catalytic components through chemical bonds. More concretely, preferred are those elements that are different from these constituent elements and have a d or f orbit. Preferably, the elements having a vacant orbit in the d or f orbit or having two or more oxidation states are used. The elements having the vacant orbit in the d or f orbit have an energy level approximate to those of the catalytic components to be supported and easily exchange electrons. Therefore, a similar function can be expected.

Concrete examples of the elements having the vacant orbit in the d or f orbit are W, Ti, V, Cr, Mn, Fe, Co, Ni, Zr, Mo, Ru, Rh, Ce, Ir and Pt, and one or more kinds of these elements can be used. Among these elements, W, Ti, V, Cr, Mn, Fe, Co, Mo, Ru, Rh, Ce, Ir and Pt are the elements that have two or more oxidation states. Other concrete examples of other elements having two or more oxidation states are Cu, Ga, Ge, Se, Pd, Ag and Au.

When these replacing elements replace the constituent elements of the ceramic, it is possible to employ a method that reduces, in advance, a part of the starting materials of the constituent elements to be replaced in the ceramic raw materials, and instead adds and kneads the raw materials of the replacing elements. The resulting mixture is then molded into the monolithic shape, for example, dried, degreased in an atmosphere of atmospheric air and fired. The thickness of the cell walls 12 of the ceramic support 11 is ordinarily not greater than 150 μm. The wall thickness is preferably smaller because the heat capacity becomes smaller. Alternatively, a part of the raw materials of the constituent elements to be replaced is in advance decreased in accordance with the substitution amount. After the raw materials are kneaded, molded and dried in a customary manner, the resulting molding may be impregnated with a solution containing the replacing elements. After impregnation, the molding is taken out from the solution and is similarly dried, degreased in the atmosphere of atmospheric air and fired. This method of immersing the molding in the solution can allow a large number of replacing elements to exist on the surface of the molding. Eventually, element substitution takes place on the surface of the molding during firing, so that a solid solution is formed more easily.

The amounts of the replacing elements are such that the total substitution amount is from 0.01 to 50%, preferably from 5 to 20%, of the number of atoms of the constituent elements to be replaced. When the replacing elements are elements having different valences from those of the ceramic constituent elements, lattice defects or oxygen defects simultaneously occur depending on the difference of the valence. However, these defects do not occur when a plurality of replacing elements is used in such a fashion that the sum of the oxidation numbers of the replacing elements becomes equal to the sum of the oxidation numbers of the constituent elements to be replaced. When the change of the valence is thus eliminated as a whole, the catalytic components can be supported only through the bonds with the replacing elements.

The start catalyst 1 can be readily obtained when the catalyst precious metal 13 as the main catalytic component and the assistant catalyst 14 are supported on this ceramic support 11. To support the catalytic components, a method that allows the ceramic support 11 to be impregnated with a solution dissolving therein the catalytic components is employed. In consequence, the catalytic components are chemically bonded onto the replacing elements and necessary amounts of catalytic components can be supported without γ-alumina coating. The solvent for supporting the catalytic components can use water or an alcohol type solvent such as methanol. After impregnation of the catalytic components, the support is next dried and is fired at 500 to 800° C.

The catalyst precious metal 13 and the assistant catalyst 14 may be supported by immersing the ceramic support 11 into the solution containing these catalytic components, or may be supported separately in separate process steps by use of a plurality of catalyst solutions. When the metal element or elements as the assistant catalyst are the replacing elements for chemically bonding the catalytic components, the assistant catalyst 14 can be incorporated during the production process of the ceramic support 11. When this method is employed, the process step of supporting the assistant catalyst 14 can be omitted. The support amount of the catalytic component is ordinarily and preferably 0.05 to 10 g/L for the precious metal catalyst and 10 to 250 g/L for the assistant catalyst.

The three way catalyst 2 as the main catalyst can use a known catalyst. More concretely, it is possible to use a catalyst prepared by forming a coating layer of alumina, etc, on a ceramic support consisting mainly of cordierite and having a monolithic shape, and supporting a catalyst precious metal such as Pt, Rh or Pd and an assistant catalyst as the catalytic components. Examples of the assistant catalyst are metal elements such as Rb, Sr, Y, Zr, Nb, Mo, Tc, Ru, Sc and lanthanoids (La, Ce, Pr, Nd, Pm, Sm, Eu, Gd, Tb, Dy, Ho, Er, Tm, Yb, and Lu), and their oxides. At least one kind of these elements can be used. It is also possible to constitute the three way catalyst 2 by use of a ceramic support 11 having a catalyst support function similar to that of the start catalyst 1, and to directly support the catalytic components on this ceramic support 11.

As described above, the catalyst for automobiles according to this embodiment is a direct support catalyst in which the ceramic support 11 directly supports the catalytic components through the chemical bonds. Therefore, this catalyst does not need a coating layer, has a low heat capacity and can enlarge the open area of the cells. The catalyst has great effects for decreasing the exhaust emission by early activation and reducing the pressure loss. Moreover, because the catalytic components are chemically bonded, they can be uniformly dispersed on the surface of the ceramic support 11, catalyst performance can be effectively exhibited, and durability can be drastically improved. The start catalyst 1 is arranged at a high temperature portion of the exhaust pipe P and must have heat resistance. As the catalytic components are chemically bonded, however, the ceramic support 1 has a high bonding strength with the catalytic components and provides a great effect of preventing aggregation and degradation of the catalytic components due to heat. As an acid treatment is not employed, the problem of the drop of the strength does not occur. Therefore, the catalyst can keep initial performance for a long time.

Next, an actual car test was carried out to evaluate performance of the start catalyst 1 having the construction described above. In the ceramic support 11 of the start catalyst 1, W replaces 5% of Si as one of the constituent elements of cordierite. The ceramic support 11 is shaped into a molding of a monolithic shape having a cell wall thickness of 100 μm, a cell density of 400 cpsi, a diameter of 86 mm and a length of 120 mm, and the molding is fired in atmospheric air. The start catalyst 1 is produced by supporting 90 g/L in total of Pt and Rh as the catalyst precious metal 13 and ceria ($CeO_2$) as the assistant catalyst 14, and is fitted to an upstream portion of the exhaust pipe of an actual car (exhaust capacity: approx. 2,000 cc). The time required for activating the catalyst is measured.

For comparison, a start catalyst 1 is produced by forming a coating layer (200 g/L) of alumina on a ceramic support formed of cordierite without element substitution, and by then supporting the catalytic components in the same way as described above. This catalyst is tested in the same way. As a result, it is found that the time required for activating the catalyst is 20 seconds for the start catalyst 1 of the invention and is 26 seconds for the comparative start catalyst. It has thus been confirmed that when the start catalyst 1 of the invention is used, the activation time can be shorted by 6 seconds.

The first embodiment described above uses the ceramic support capable of directly supporting the catalytic components by incorporating the replacing elements into the substrate ceramic. The ceramic support may be a ceramic support having a large number of fine pores capable of directly supporting the catalytic components on the surface of the substrate ceramic. Concretely, the fine pores comprises at least one kind of defects (oxygen defects or lattice defects) in the ceramic crystal lattice, fine cracks on the ceramic surface and defects of the elements constituting the ceramic. At least one kind of these fine pores may well be supported on the ceramic support, and a plurality of kinds may be combined, too. To support the catalytic components without forming a coating layer having a high specific area such as γ-alumina, the diameter or width of these fine pores is not greater than 1,000 times (100 nm) of the diameter (generally about 0.1 nm) of the catalytic components to be supported and preferably 1 to 1,000 times (0.1 to 100 nm). The depth of the fine pores is preferably at least ½ of the diameter of the catalytic component ions and generally at least 0.05 nm. To support at least the equivalent amount of the catalytic component (1.5 g/L) to that of the prior art at this size, the number of the fine pores is at least $1 \times 10^{11}$ pieces/L, preferably at least $1 \times 10^{16}$ pores/L and more preferably at least $1 \times 10^{17}$ pores/L.

The defects of the crystal lattice in the fine pores formed on the ceramic surface include the oxygen defects and the lattice defects (metal vacant lattice point and lattice strain). The oxygen defect is the one that results from a vacancy of oxygen constituting the ceramic crystal lattice. The catalytic components can be supported in the fine pores formed by vacancy of oxygen. The crystal lattice defect is the defect created when oxygen is entrapped in an amount greater than the necessary amount for constituting the ceramic crystal defect. The catalytic components can be supported in the fine pores formed by the strain of the crystal lattice and the metal vacant lattice points.

More concretely, when the cordierite honeycomb structure contains at least $4\times10^{-6}\%$, preferably at least $4\times10^{-5}\%$, of cordierite crystals that have at least one of the oxygen defect and the lattice defect per unit crystal lattice of cordierite, or when the cordierite structure contains $4\times10^{-8}$ pieces, preferably $4\times10^{-7}$ pieces, per unit crystal lattice of cordierite, of at least one of the oxygen defect and the lattice defect, the number of the fine pores of the ceramic support exceeds the predetermined number described above. Next, the detail of the fine pores and a formation method will be explained.

The oxygen defects can be created in the crystal lattice in the following way as described in Japanese Patent Application No. 2000-104994. In a process for shaping cordierite materials containing an Si source, an Al source and an Mg source, degreasing, and then firing the materials, it is possible to employ the following three methods, i.e. (1) a method that sets the firing atmosphere to a reduced pressure atmosphere or to a reducing atmosphere, (2) a method that uses a compound not containing oxygen in at least a part of the starting materials and firing the materials in a low oxygen concentration atmosphere to render the oxygen concentration deficient in the firing atmosphere or in the starting materials, and (3) a method that replaces at least one kind of the constituent elements of the ceramic other than oxygen by an element having valence smaller than that of that constituent element. In the case of cordierite, the constituent elements have positive electric charges of Si (4+), Al (3+) and Mg (2+). Therefore, when elements having smaller valence replace these constituent elements, the positive charge corresponding to the difference of the valence with the replaced elements and to the replacing amounts becomes deficient. To keep the electrical neutrality as the crystal lattice, O (2−) having the negative charge is emitted, forming thereby the oxygen defects.

The lattice defect can be formed by (4) a method that replaces a part of the ceramic constituting elements by an element or elements having valence greater than that of the replaced element. When at least a part of Si, Al and Mg as the constituent elements of cordierite is replaced by an element having valence greater than the replaced element, the positive charge corresponding to the difference with the replaced element and to the replacing amount becomes excessive, and a necessary amount of O (2−) having the negative charge is taken to keep the electrical neutrality as the crystal lattice. Because oxygen thus taken operates as an obstacle, it impedes the arrangement of the cordierite crystal lattice in the regular order, thereby creating the lattice strain. The firing atmosphere in this case should be air so that oxygen can be sufficiently supplied. Alternatively, a part of Si, Al and Mg is emitted to keep the electrical neutrality, forming voids. Since the size of these defects is believed to be in the order of several angstroms or less, the specific surface area cannot be measured by ordinary measurement methods of the specific area using nitrogen atoms such as the BET method.

The number of the oxygen defects and that of the lattice defects have a correlation with the oxygen content in cordierite, and the oxygen amount is preferably less than 47 wt % (for the oxygen defects) and at least 48 wt % (for the lattice defects). When the oxygen amount is less than 47 wt % due to the formation of the oxygen defect, the number of oxygen atoms contained in the cordierite unit crystal lattice is smaller than 17.2, and the lattice constant of the $b_o$ axis of the cordierite crystal axis is smaller than 16.99. When the oxygen amount is greater than 48 wt %, the number of oxygen atoms contained in the cordierite unit crystal lattice is greater than 17.6, and the lattice constant of the $b_o$, axis of the cordierite crystal axis is greater or smaller than 16.99.

Figure 2:
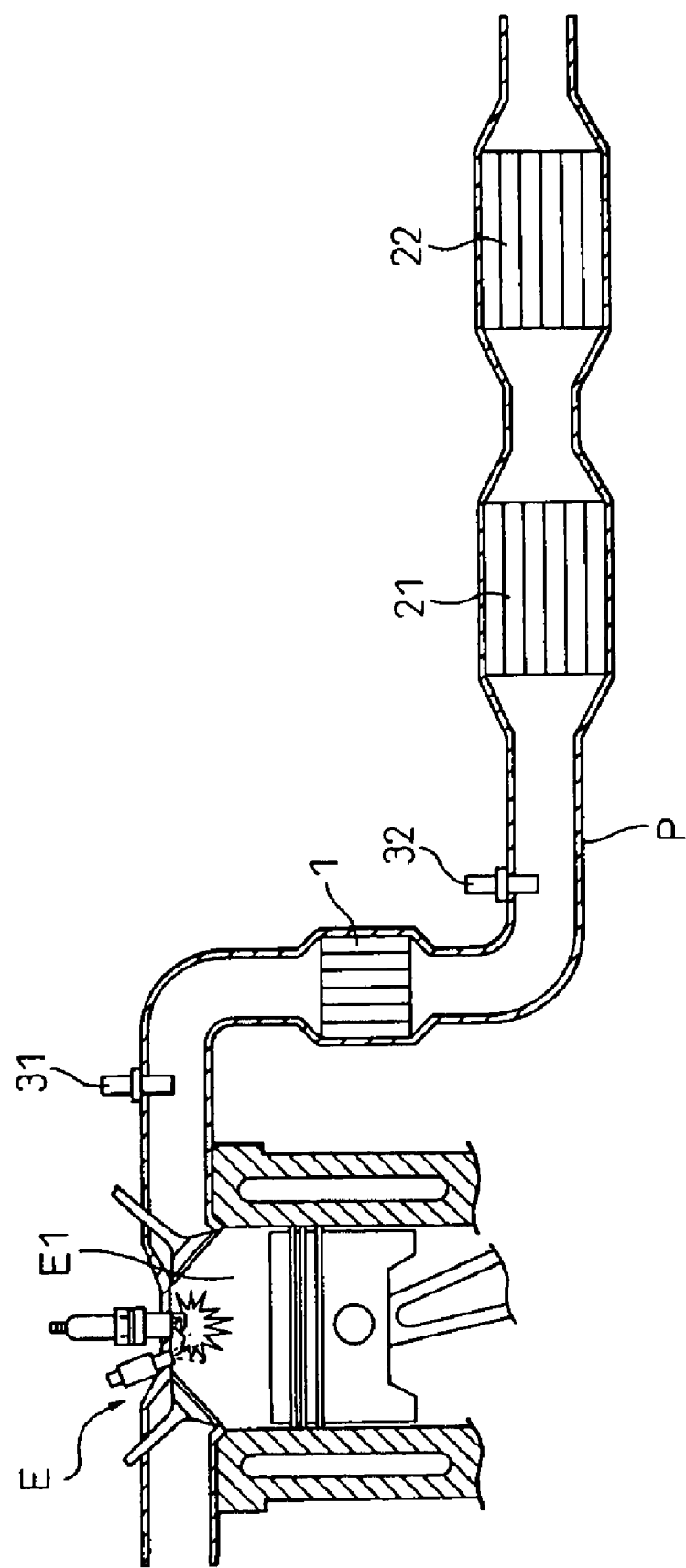
FIG. 2 is an overall schematic structural view of a catalyst for automobiles according to a second embodiment of the invention.

Besides the construction of the first embodiment described above, it is possible to arrange a plurality of three way catalysts 21 and 22 as the main catalyst at intermediate positions of the exhaust pipe P as in the second embodiment of the invention shown in FIG. 2. The start catalyst has the same construction and the same arrangement as those in the first embodiment. The catalyst system having such a construction can exhibit a remarkable effect in early activation and in the reduction of the pressure loss by using the direct support that supports the catalytic components through the chemical bonds without using the coating layer.

Figure 3A:
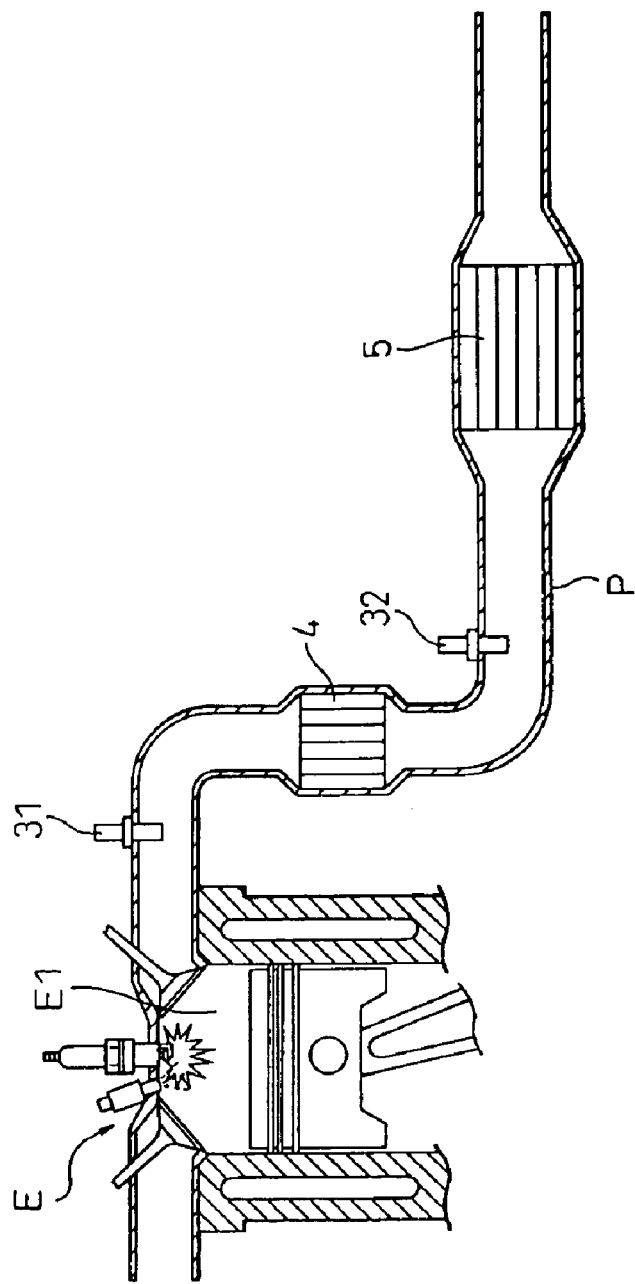
Figure 3B:
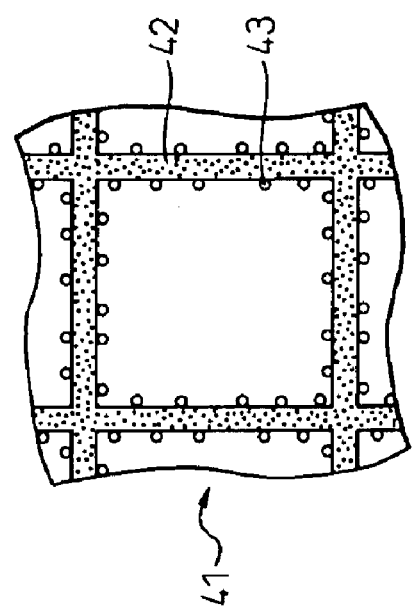

FIGS. 3(a) and 3(b) show a construction of a catalyst for automobiles according to the third embodiment of the invention. In a catalyst system using a NOx catalyst 5 as a main catalyst for a lean-burn engine and for a direct injection gasoline engine, a start catalyst 4 is a direct support catalyst. A ceramic support 41 of the start catalyst 4 has the same construction as that of the first embodiment and contains replacing elements capable of being chemically bonded to the catalytic components, the replacing elements directly supporting a catalyst precious metal 43. In the NOx catalyst system, control delay is likely to occur at the time of NOx purge control due to an assistant catalyst supported by the start catalyst 4, and the use of the assistant catalyst can be avoided. However, a small amount of an assistant catalyst can be supported within the range where control of the start catalyst 4 is not affected. In this case, the support amount of the assistant catalyst having an oxygen absorption capability is preferably 10 g/L or less in order to prevent absorption of the air-fuel ratio fluctuation necessary for the NOx purge.

An absorption-reduction type NOx catalyst and a known ordinary catalyst can be used for the NOx catalyst 5. The absorption-reduction type NOx catalyst ordinarily has a construction in which a coating layer of alumina is formed on a ceramic support mainly consisting of cordierite and having a monolithic shape, and a catalyst precious metal such as Pt, Rh or Pd as the catalytic component and the NOx adsorption material for absorbing NOx during a lean operation as an assistant catalyst are supported on the ceramic support. NOx absorbed into the NOx absorption material during the lean operation is purged when the air-fuel ratio is controlled to temporarily attain a rich atmosphere (reducing atmosphere), and is reduced and purified on the catalyst precious metal such as Pt, Rh or Pd. Examples of the assistant catalyst having the NOx absorption capability are alkali metal elements such as Na, K, Rb, Cs and Fr and alkaline earth metals such as Mg, Ca, Sr, Ba and Ra. NOx absorption capability can also be imparted by use of rare earth elements such as Sc, Y, La and Ce, and transition metals such as Cr, Mn, Fe, Co, Ni, Cu and Zr.

By using the direct support catalyst as the start catalyst 4, this embodiment can accomplish early activation and the reduction of the pressure loss by making most of the high heat resistance, the low thermal capacity and the high open area of the direct support catalyst. Incidentally, the NOx catalyst 5 is not limited to the absorption-reduction type NOx catalyst, and a similar effect can be obtained by using any NOx catalyst such as a NOx absorption type so long as it is a NOx catalyst that purifies NOx through the same mechanism.

Figure 4:
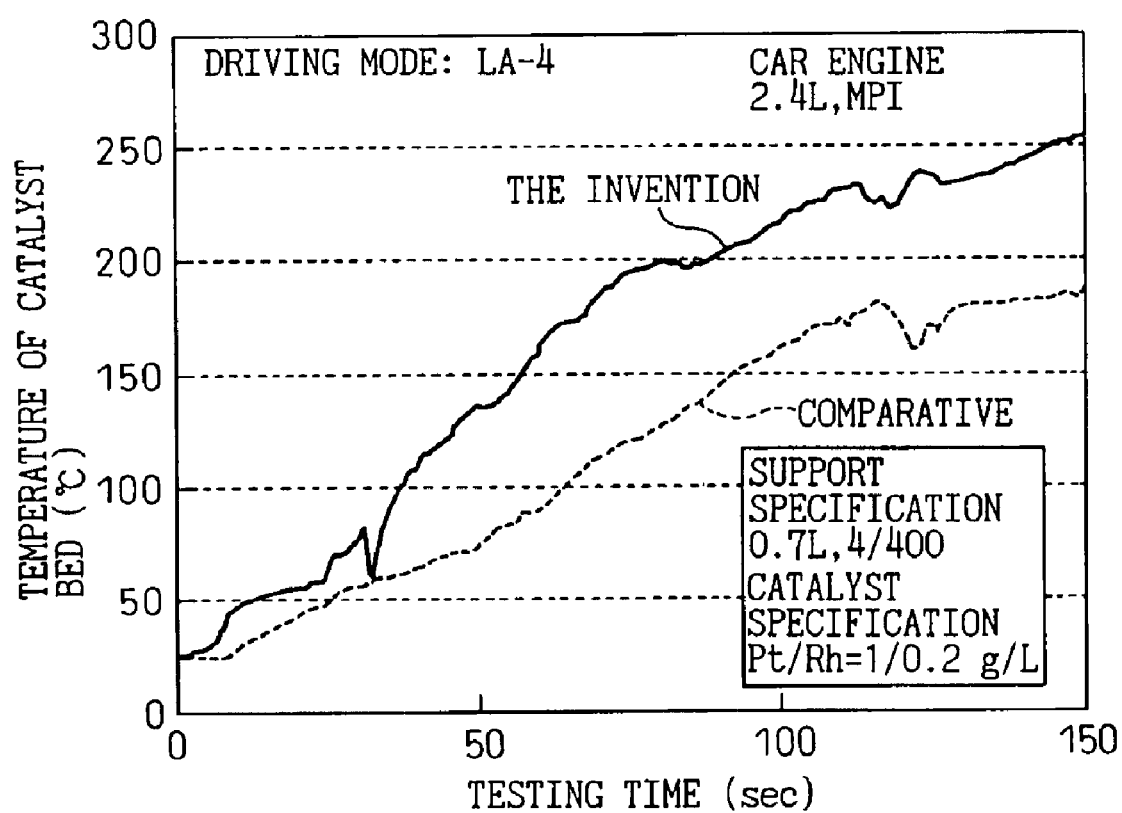
FIG. 4 is a graph showing changes, over time, of catalyst center temperatures of a start catalyst of the invention and of a comparative product.

To evaluate performance of the start catalyst 4 having the construction described above, an actual car test was conducted to examine the time change of the catalyst temperature with the result shown in FIG. 4. The ceramic support 41 of the start catalyst 4 is a monolithic direct support in which W replaces 5% of Si as the constituent element of cordierite, and Pt and Rh are supported as the catalyst precious metal 43 to give the start catalyst 4. This start catalyst 4 is fitted to an upstream portion of the exhaust pipe of an actual car and the temperature of the catalyst center portion is measured. The specification of the support and the catalyst and the actual car test condition are listed below.

support specification:

0.7L, 4/400 (cell wall thickness/cell density)

catalyst specification:

Pt/Rh=1/0.2 g/L car engine: 2.4L, MPI driving mode: LA-4

For comparison, an alumina coating layer (200 g/l) is formed on a ceramic support made of cordierite that is not element-substituted, and the catalytic components are similarly supported to give a catalyst (comparative catalyst). It has been confirmed that the temperature at the catalyst center portion rises more quickly in the start catalyst 4 of the invention than the comparative catalyst, and the start catalyst 4 provides a great effect of achieving early activation of the catalyst system.

As in the fourth embodiment of the invention shown in FIG. 5(a), the main catalyst may be of a two-stage integration type including a NOx catalyst 61 as a prior stage catalyst layer and a three way catalyst 62 as a post stage catalyst layer. As in the fifth embodiment of the invention shown in FIG. 5(b), the three way catalyst 23 may be separately disposed inside the exhaust pipe P on the downstream side of the NOx catalyst 5. In either case, as the start catalyst 4 not supporting the assistance catalyst is disposed on the upstream side of the exhaust pipe P, the effect of early activation can be similarly obtained. When the catalyst is of the two-stage integration type as in the fourth embodiment, the construction of a catalyst converter becomes compact and the cost can be reduced. When the catalytic components have the difference of heat resistance, a catalyst having a lower heat resistance can be disposed on the downstream side having a lower temperature. Furthermore, design freedom can be improved.

Figure 6A:
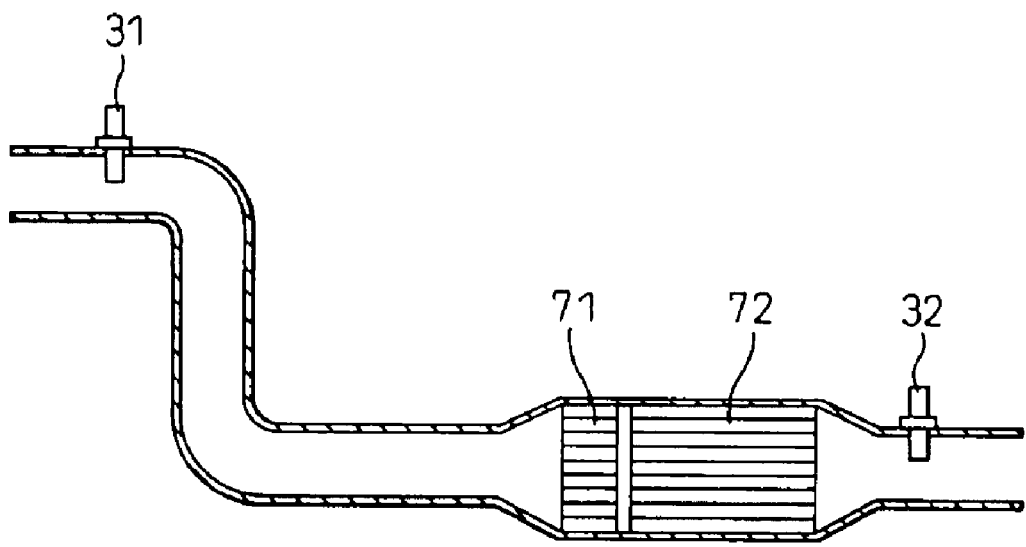
FIG. 6(a) is an overall schematic structural view of a catalyst for automobiles according to a sixth embodiment of the invention.

FIG. 6(a) shows the sixth embodiment of the invention. In this embodiment, the catalyst is of the two-stage integration type catalyst not having the start catalyst. The catalyst layer of the foremost stage of the main catalyst 7 is a three way catalyst 71 directly supporting the catalytic component, and the catalyst layer of the post stage is a NOx catalyst 72. The three way catalyst 71 directly supports the catalyst precious metal on the ceramic support subjected to element substitution in the same way as in the first embodiment, and has the NOx catalyst 72 in the post stage. Therefore, this catalyst 71 does not support the assistant catalyst.

In the catalyst system not having the start catalyst, early activation can be achieved in a simple construction by directly disposing the support catalyst at a high temperature portion that is closest to the engine. This system is advantageous when an installation space of the catalyst system is limited. Installation of a system that detects degradation of car devices such as the catalyst system and notifies the driver of this degradation has been required in recent years. When the catalyst is of the integration tipe, the system can be simplified without the necessity for providing a dedicated degradation detector to the direct support catalyst.

Figure 6B:
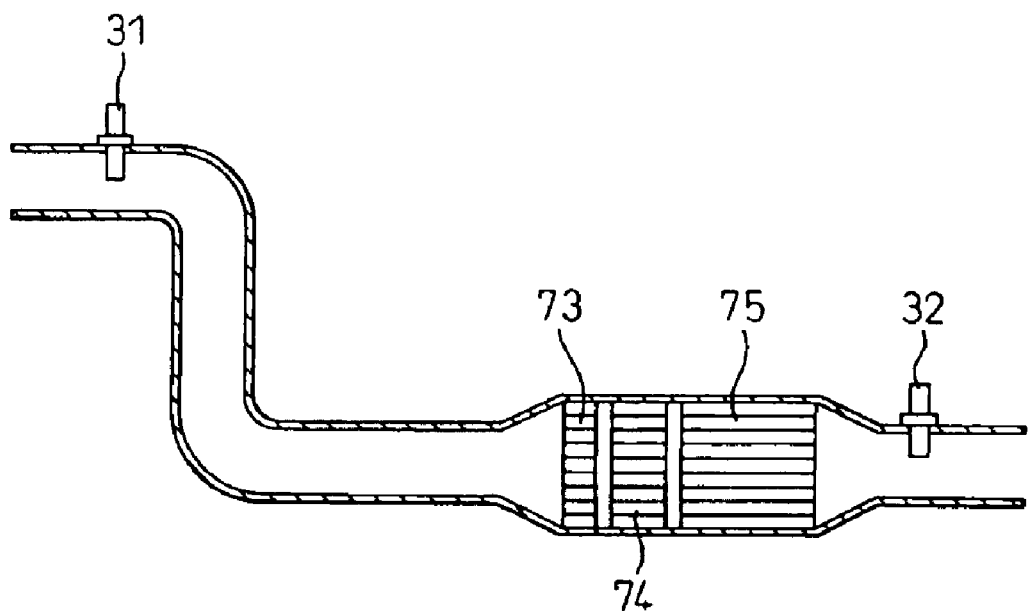
FIG. 6(b) is an overall schematic structural view of a catalyst for automobiles according to a seventh embodiment of the invention.

As in the seventh embodiment of the invention shown in FIG. 6(b), the main catalyst may be of a three-stage integration type having a construction in which a three way catalyst 73 (without an assistant catalyst) directly supporting catalytic components is disposed as a catalyst layer of the foremost stage, and a NOx catalyst 74 and a three way catalyst 75 are arranged on the downstream side of the three way catalyst 73.

Figure 7:
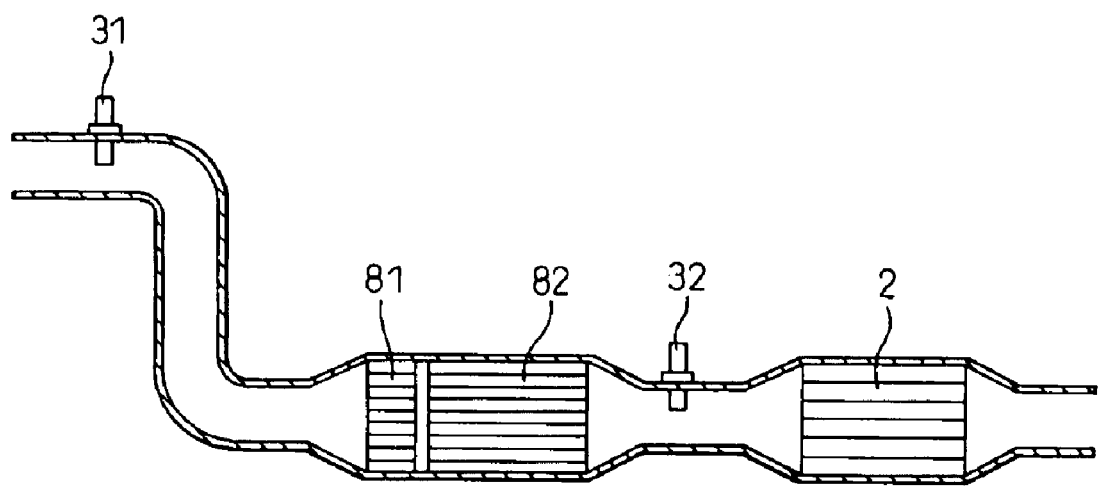
FIG. 7 is an overall schematic structural view of a catalyst for automobiles according to an eighth embodiment of the invention.
Figure 8:
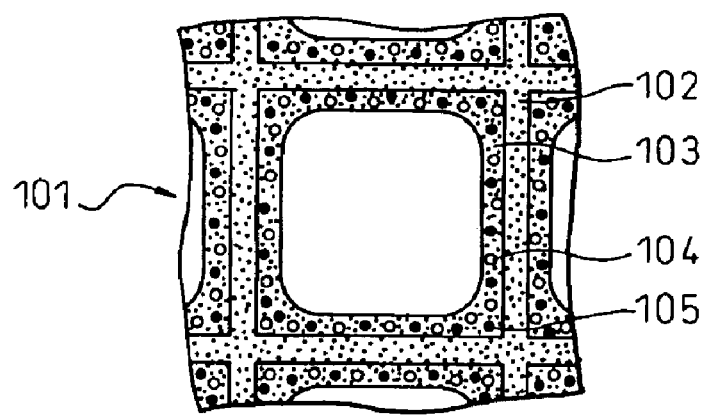
FIG. 8 is an enlarged sectional view of principal portions of a ceramic support of a catalyst for automobiles according to the prior art.

Furthermore, as in the eighth embodiment of the invention shown in FIG. 7, the main catalyst 8 may be of a two-stage integration type having a construction in which a catalyst layer of a pre-stage is a three way catalyst 81 directly supporting a catalyst precious metal and an assistant catalyst, a catalyst layer of a post-stage is a three way catalyst 82, and another three way catalyst 24 is disposed on the downstream side of the three way catalyst 82.

As explained above, since this invention uses the direct support catalyst for the start catalyst or for the catalyst layer of the foremost stage of the multi-stage integration type catalyst, the invention can provide the effects of early activation of the catalyst system, the reduction of the pressure loss and the improvement of the heat resistance. Therefore, the invention can provide a catalyst for automobiles that is excellent in purification performance and has high durability.

What is claimed is:

1. A catalyst for automobiles including a start catalyst disposed at an upstream portion of an exhaust passage of an internal combustion engine of an automobile and a main catalyst disposed on its downstream side, wherein said start catalyst is a direct support catalyst comprising a ceramic support capable of directly supporting a catalyst on a surface of a substrate ceramic, and catalytic components directly supported by said ceramic support, wherein at least one element constituting a ceramic of said ceramic support is replaced by an element other than said ceramic support, and can be directly supported on said replacing element, and wherein said start catalyst has a lower thermal capacity than said main catalyst thereby achieving early activation of said start catalyst and improving catalytic performance and exhaust purification.

2. A catalyst for automobiles including a start catalyst disposed at an upstream portion of an exhaust passage of an internal combustion engine of an automobile and a main catalyst disposed on its downstream side, wherein said start catalyst is a direct support catalyst comprising a ceramic support capable of directly supporting a catalyst on a surface of a substrate ceramic, and catalytic components directly supported by said ceramic support, wherein said ceramic support has a large number of fine pores capable of directly supporting a catalyst on a surface of a substrate ceramic, and a catalyst metal directly supported in said fine pores and wherein said start catalyst has a lower thermal capacity than said main catalyst thereby achieving early activation of said start catalyst and improving catalytic performance and exhaust purification.

3. A catalyst for automobiles according to claim 1 or 2, which includes a three way catalyst or a NOx catalyst as said main catalyst.

4. A catalyst for automobiles according to claim 3, wherein said main catalyst contains a NOx catalyst, and an assistant catalytic component for said catalytic components in said start catalyst present in an amount not greater than 10 g/L in said start catalyst.

5. A catalyst for automobiles according to claim 4, wherein a three way catalyst is disposed on the downstream side of said NOx catalyst.

6. A catalyst for automobiles according to claim 3, wherein said main catalyst does not contain a NOx catalyst, and said catalytic components contain an assistant catalytic component in said start catalyst.

7. A catalyst for automobiles according to claim 1 or 2, wherein said main catalyst and said start catalyst contain a precious metal element as a main catalytic component.

8. A catalyst for automobiles according to claim 4, wherein said assistant catalytic component is at least one kind of a metal element, or its oxide, selected from the group consisting of Rb, Sr, Y, Zr, Nb, Mo, Tc, Ru, Sc, La, Ce, Pr, Nd, Pm, Sm, Eu, Gd, Tb, Dy, Ho, Er, Tm, Yb and Lu.

9. A catalyst for automobiles according to claim 2, wherein at least one of the elements constituting a substrate ceramic of said ceramic support is replaced by an element other than said components and can be directly supported on said replacing element.

10. A catalyst for automobiles according to claim 9, wherein said catalytic components are supported on said replacing element through chemical bonds.

11. A catalyst for automobiles according to claim 9, wherein said replacing element is at least one kind of elements having a d or f orbit in an electron orbit thereof.

12. A catalyst for automobiles according to claim 1, wherein said ceramic support has a large number of fine pores capable of directly supporting a catalyst on a surface of a substrate ceramic, and a catalyst metal can be directly supported in said fine pores.

13. A catalyst for automobiles according to claim 12, wherein said fine pores comprise at least one kind of defects inside a ceramic crystal lattice, fine cracks on a ceramic surface and defects of elements constituting the ceramic.

14. A catalyst for automobiles according to claim 13, wherein said fine pore has a width of not greater than 100 nm.

15. A catalyst for automobiles according to claim 13, wherein said fine pore has a diameter or width of not greater than 1,000 times the diameter of catalyst ions to be supported, and the number of said fine pores is at least $1 \times 10^{11}$ pores/L.

16. A catalyst for automobiles according to claim 1 or 2, wherein said substrate ceramic contains cordierite as a component thereof and has a monolithic support shape.

17. A catalyst for automobiles according to claim 2, wherein said fine pores comprise at least one kind of defects inside a ceramic crystal lattice, fine cracks on a ceramic surface and defects of elements constituting the ceramic.

18. A catalyst for automobiles according to claim 17, wherein said fine pore has a width of not greater than 100 nm.

19. A catalyst for automobiles according to claim 17, wherein said fine pore has a diameter or width of not greater than 1,000 times the diameter of catalyst ions to be supported, and the number of said fine pores is at least $1 \times 10^{11}$ pores/L.

* * * * *